(12) United States Patent
Frizon et al.

(10) Patent No.: US 8,357,019 B2
(45) Date of Patent: Jan. 22, 2013

(54) PROPULSION CHAIN

(75) Inventors: Jean-Marie Frizon, Chalonvillars (FR); Andre Viard, Cravanche (FR); Lionel Julliand, Beaucourt (FR)

(73) Assignee: Converteam Technology Ltd., Warwickshire (GB)

( * ) Notice: Subject to any disclaimer, the term of this patent is extended or adjusted under 35 U.S.C. 154(b) by 19 days.

(21) Appl. No.: 12/807,401

(22) Filed: Sep. 3, 2010

(65) Prior Publication Data
US 2011/0111653 A1 May 12, 2011

(30) Foreign Application Priority Data
Sep. 4, 2009 (FR) .................................... 09 04226

(51) Int. Cl.
*B63H 20/14* (2006.01)
(52) U.S. Cl. ................. 440/6; 440/75; 60/702
(58) Field of Classification Search .............. 440/6, 75; 60/702, 716
See application file for complete search history.

(56) References Cited

U.S. PATENT DOCUMENTS

| | | | | | |
|---|---|---|---|---|---|
| 4,435,961 | A | * | 3/1984 | Stewart | 60/719 |
| 4,741,165 | A | * | 5/1988 | Kobus | 60/700 |
| 4,964,276 | A | * | 10/1990 | Sturdy | 60/700 |
| 5,305,213 | A | * | 4/1994 | Boardman et al. | 701/54 |
| 5,417,597 | A | * | 5/1995 | Levedahl | 440/6 |
| 7,241,192 | B2 | * | 7/2007 | Andersen et al. | 440/1 |
| 8,036,809 | B2 | * | 10/2011 | Egle et al. | 701/103 |
| 2003/0089535 | A1 | * | 5/2003 | Kanzler et al. | 180/9.44 |
| 2008/0315583 | A1 | | 12/2008 | Beck et al. | |
| 2009/0150043 | A1 | * | 6/2009 | Eriksson et al. | 701/102 |
| 2009/0315329 | A1 | * | 12/2009 | Duffey et al. | 290/44 |

FOREIGN PATENT DOCUMENTS

JP 59-018216 1/1984

* cited by examiner

*Primary Examiner* — Stephen Avila
(74) *Attorney, Agent, or Firm* — Davidson, Davidson & Kappel, LLC

(57) ABSTRACT

A propulsion chain (8) for a ship (6) including a main heat engine (18); at least one secondary electrical power house (26) powering a distribution panel (34); at least one transmission line (16) provided with an end propeller (14) and mechanically coupled to the main heat engine (18) to drive the latter; at least one rotating electrical machine (22) mechanically coupled to the transmission line (16) and powered from the distribution panel (34), a mechanical coupler (20) able to be freed from the main heat engine (18) and the rotating electrical machine (22) arranged on the transmission line (16), between the rotating electrical machine (22) and the main heat engine (18). A synchronizer (60) for synchronizing the speeds of the rotating electrical machine (22) and the main heat engine (18) before coupling of the rotating electrical machine (22) and the main heat engine (18), and an engager for engaging the mechanical coupler when the speeds of the rotating electrical machine (22) and the main heat engine (18) are essentially equal, i.e. correspond.

15 Claims, 3 Drawing Sheets

PROPULSION CHAIN

This claims the benefit of French Patent Application FR 0904226, filed Sep. 4, 2009 and hereby incorporated by reference herein.

The present invention concerns a propulsion chain of the type including:

a main heat engine, at least one secondary electrical power house powering a distribution panel;

at least one transmission line provided with an end propeller and mechanically coupled to the main heat engine to drive the latter, at least one rotating electrical machine mechanically coupled to the transmission line and powered from the distribution panel, a mechanical coupling means able to be freed from the main heat engine and the rotating electrical machine arranged on the transmission line, between the rotating electrical machine and the main heat engine.

BACKGROUND

Ships of great bulk are commonly equipped with a diesel engine producing the energy necessary to drive the submerged transmission line and propeller. The diesel engine is permanently connected to the transmission line to drive the propeller turning at the same speed as the engine.

Moreover, it is known to mechanically couple, to the transmission line, a rotating electrical machine, which is capable of receiving electrical energy that it converts into mechanical energy in order to provide additional mechanical energy to drive the propeller.

According to another operating mode, the rotating machine is used as a generator to produce electrical energy from mechanical energy provided by the main heat engine.

The ship also includes a secondary electrical power house including at least one auxiliary internal heat engine coupled to an alternator able to convert the mechanical energy coming from the secondary engine into electrical energy, and possibly an energy recovery system on the exhaust gases from the main engine that powers another alternator. The secondary heat engine is preferably a four stroke high speed diesel engine, powered with MDO (Marine Diesel Oil) or natural gas (LNG) light diesel. The electrical energy supplied by the secondary power house can be used to drive the rotating machine mechanically coupled to the transmission line.

Ships equipped with such a propulsion chain allow optimized management of the energy supplied by the main engine and the secondary power house, in that the main engine can be used to supply electrical energy on board the ship and the secondary power house can be used to participate in the propulsion of the ship via the rotating machine, which contributes, in addition to the main heat engine, to driving the propeller.

However, such a propulsion chain can be oversized and polluting for the driving of the ship under certain circumstances, in particular upon entering and leaving ports, or when the ship is used at reduced speeds.

For these particular operating circumstances, it is known to provide, on the transmission line between the main heat engine and the rotating machines, releasable coupling means that make it possible to uncouple the main heat engine and only use the rotating machine for entering or leaving ports.

SUMMARY OF THE INVENTION

To engage or release the coupling means, it is necessary to act manually on the coupling means, in particular to remove or add mechanical elements such as bolts. This intervention requires that the heat engine and the rotating machine be stopped. Thus, the engagement or release of the coupling means is time-consuming.

The invention aims to propose a propulsion chain for a ship allowing optimal management of energy and emissions, both when the ship is full away or in regulated zones and when it is maneuvering in a port, that is quick to use.

The present invention provides a propulsion chain of the aforementioned type, characterized in that it includes means for synchronizing the speed of the rotating electrical machine and the main heat engine before coupling of the rotating electrical machine and the main heat engine, and means for engaging the coupling means when the speeds of the rotating electrical machine and the main heat engine are essentially equal.

The present invention provides the propulsion chain for a ship including one or several of the following features:

the main heat engine is a two stroke engine;

a thrust bearing capable of transmitting a thrust along the axis of the transmission line to the hull of the ship is installed between the propeller and the releasable mechanical coupling means;

the thrust bearing is integrated into the rotating electrical machine;

the releasable mechanical coupling means of the main heat engine and the rotating electrical machine is a clutch;

the propulsion chain includes a piloting unit capable of ensuring, during maneuvering phases of the ship, a mechanical disconnection of the main heat engine from the transmission line by releasing the mechanical coupling means and a supply of electrical current of the rotating machine owing to the energy supplied by the distribution panel and coming from the secondary electrical power house;

the transmission line is connected, without speed reduction unit, to the heat engine, such that the propeller is driven in rotation at the rotational speed of the main heat engine;

the propulsion chain includes a reversible converter for shaping the electric current connected between the rotating electrical machine and the electric distribution panel, said electric distribution panel also being connected to an electrical power distribution system of the ship;

the propulsion chain includes an energy recovery turbine on the exhaust of the main heat engine, said turbine being mechanically coupled to an alternator whereof the electrical power outlet is connected to the electrical distribution panel;

the rotating electrical machine includes a rotor mounted around the axis of the transmission line;

the synchronization means includes means for adjusting the torque set point of the rotating electrical machine;

the synchronization means includes speed sensors measuring the rotational speeds of the main heat engine and the rotating machine;

the synchronization means includes position sensors arranged on the main heat engine and the rotating machine; and the propulsion chain includes means for synchronizing the relative angular positions of the rotating electrical machine and the main heat engine before coupling of the rotating electrical machine and the main heat engine, the means for engaging the coupling means are adapted to ensure the engagement of the coupling means when the angular positions of the rotating electrical machine and the main heat engine are in the predetermined relative positions.

The invention also concerns a ship including a hull and a propulsion chain as defined above.

BRIEF DESCRIPTION OF THE DRAWINGS

The invention will be better understood upon reading the following description, provided solely as an example and done in reference to the drawings, in which.

DETAILED DESCRIPTION

Figure 1:
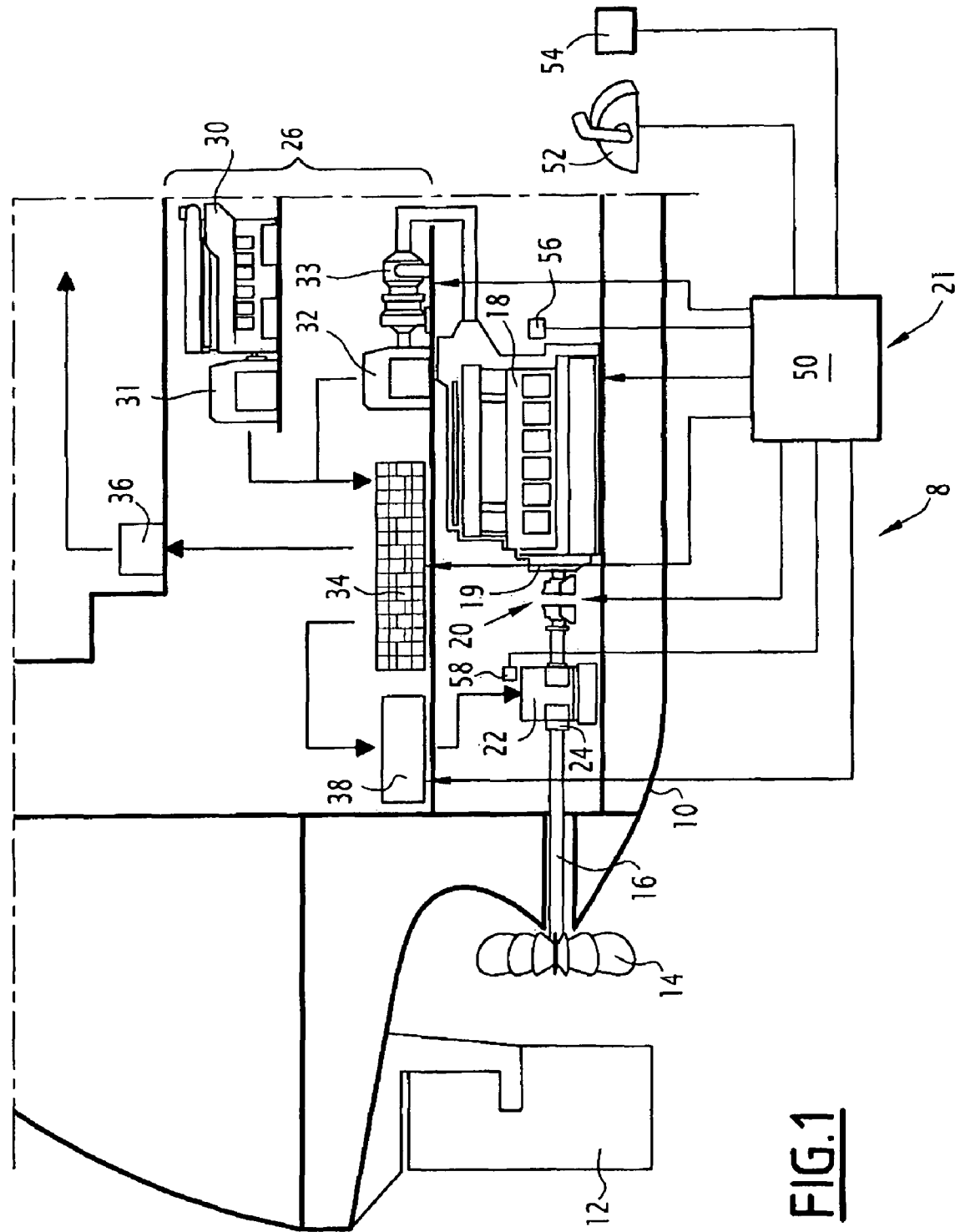
FIG. 1 is a diagrammatic longitudinal cross-sectional view of the rear portion of the hull of a ship equipped with a propulsion chain according to the invention.

The ship 8 partially illustrated in FIG. 1 includes a hull 10 equipped at its rear end with a rudder 12 in front of which a propeller 14 is mounted. This propeller is fastened to the end of a transmission line 16 penetrating the hull. At its other end, the transmission line 16 is connected directly engaged with the outlet of a main heat engine 18 for driving the transmission line. Said engine is preferably a diesel engine and advantageously a "slow" diesel engine, i.e. a two stroke engine having a rotational speed of less than 150 rpm. The engine can be supplied with heavy fuel, such as Heavy Fuel Oil (HFO) or Intermediate Fuel Oil (IFO).

The engine 18 includes, as is known in itself, a thrust bearing 19 capable of ensuring the transmission toward the hull 10 of the axial thrust coming from the propeller and imposed on the line.

The transmission line 16 is connected to the engine 18 by a releasable mechanical coupling means 20 for example made up of a controllable clutch, making it possible to selectively ensure the mechanical coupling or mechanical uncoupling of the transmission line 16 and the engine 18.

A system 21 for controlling the coupling is connected to the coupling means 20 to control it.

A rotating electrical machine 22 is provided on the transmission line 16, between the clutch 20 and the propeller 14, the rotor of the rotating machine 22 is made directly integral with the transmission line around the axis of the transmission line 16 without speed reduction unit. It stator is arranged around the transmission line and is made integral with the ship's hull.

The rotating electrical machine 22 being mounted directly on the line, no sprocket box or speed reducer is provided between the transmission line 16 and the rotating machine 22.

The transmission line 16 includes, between the propeller 14 and the clutch 20, a complementary thrust bearing for transmitting the thrust power coming from the propeller to the hull of the ship. In the "uncoupled" position, the bearing 24 nevertheless allows the transmission toward the hull 10 of a bi-directional axial thrust of about 30% of the nominal thrust. This therefore makes it possible to use the rotating electrical machine 22 when the main engine 18 is stopped or in a turning sequence for maintenance.

The transmission line 16 being connected directly engaged with the engine, no speed reduction unit is provided between the propeller and the engine 18, such that, when the clutch 20 ensures mechanical coupling, the main engine 18 and the propeller 14 rotate at the same speed.

The ship also includes a secondary electrical power house 26. The secondary power house 26 is preferably low-pollution. In particular, the emissions of polluting gases ($CO_2$, $NO_x$, etc. . . . ) are reduced or nonexistent. To that end, it includes, for example, solar or wind-powered generators or uses hydrogen or liquid natural gas (LNG) as fuel.

In the considered embodiment, this power house 26 includes at least one secondary heat engine 30 coupled to at least one alternator 31 capable of converting the mechanical energy from the secondary engine into electric energy. The secondary heat engine 30 is preferably a four stroke high speed diesel engine, powered with light diesel or natural gas.

The power house 26 also includes an alternator 32 mechanically connected to a turbine 33 for recovering the heat from the exhaust gases from the main heat engine 18. This turbine is capable of being driven by the exhaust gases and driving the alternator 32.

The alternators 31 and 32 are connected to a main distribution panel 34, itself connected to an electrical power system 36 of the board as well as to a reversible electrical power converter 38. The distribution panel 34 is capable of distributing the electrical power coming from the alternators 31 and 32 toward the system 36 and/or the converter 38.

The converter 38 is electrically connected to the rotating machine 22 to power it or to collect the electrical energy produced by it. The converter 38 is capable of shaping the current to enable the electrical powering of the rotating machine 22 so that the latter operates as an engine and ensures the driving of the propeller 14 with a determined torque. It is also capable of shaping the current produced by the rotating electrical machine 22 to inject it into the system 36 when it operates as generator.

The engines 18, 30, turbine 33, distribution panel 34, converter 38, and rotating electrical machine 22 are connected to the ship's control post and, preferably, to a same central information processing unit 50 allowing them to be individually controlled.

The central information processing unit 50 also constitutes the piloting element of the control system 21.

To that end, the unit 50 is connected to the coupling means 20 to engage or disengage them.

To control the ship, the unit 50 is connected to a control lever 52 making it possible to define a speed set point for the rotation of the propeller. Likewise, the unit 50 is connected to a switch 54 making it possible to define the engaged or disengaged state of the coupling means 20.

Rotational speed and/or angular position sensors of the main heat engine 18 and of the rotating electrical machine 22 are provided in the installation. More specifically, the system 21 for controlling the coupling includes a sensor 56 for determining the rotational speed $N_{réel}$ 18 and/or angular position of the main heat engine 18 as well as a sensor 58 for determining the rotational speed $N_{réel}$ 22 and/or angular position of the rotating electrical machine 22. These sensors 56, 58 are placed in interface with the rotating portion of the engine and the rotating electrical machine. They are each connected to the information processing unit 50.

Figure 2:
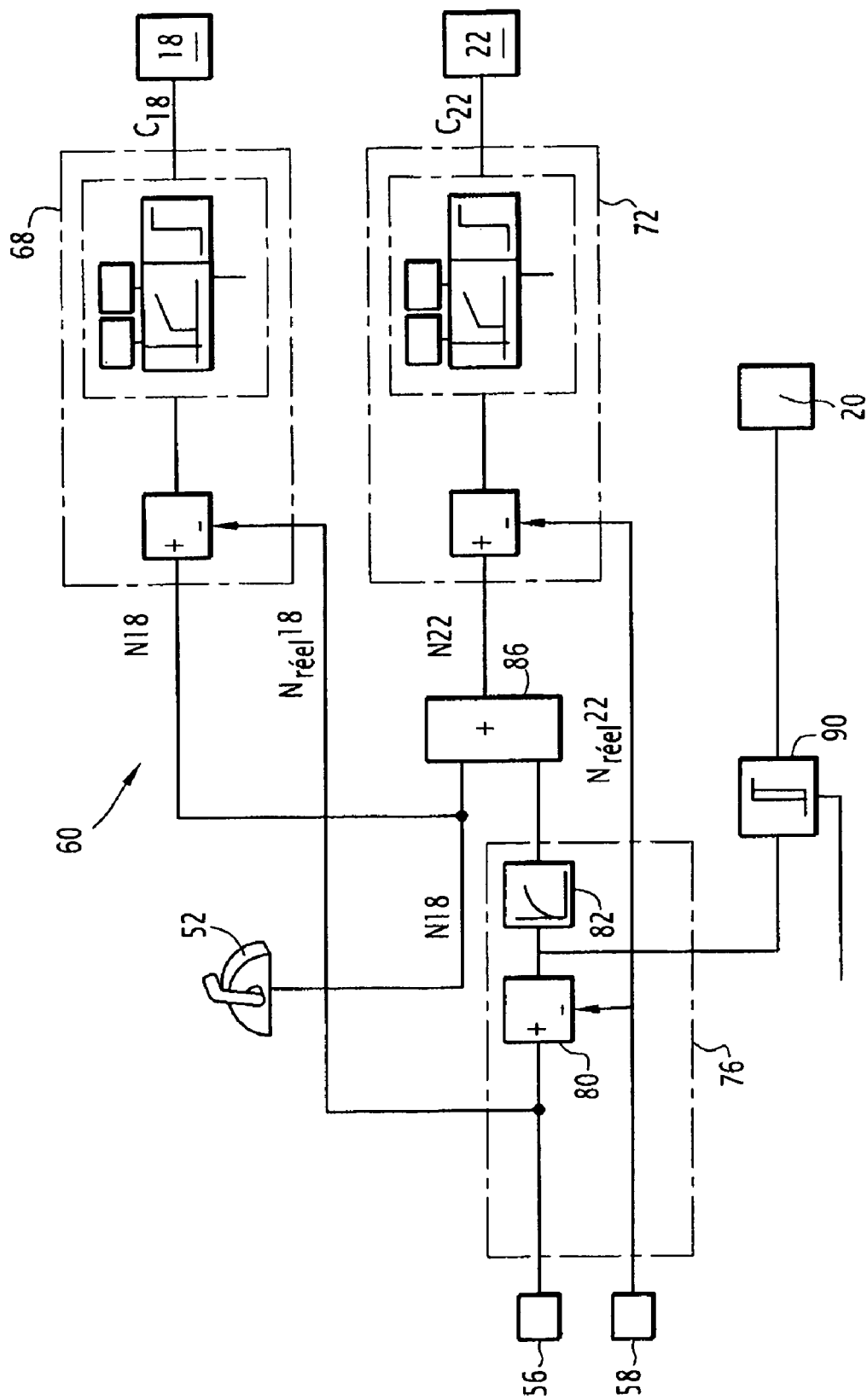
FIG. 2 is a diagrammatic view of the control chain of the propulsion chain illustrated in FIG. 1.

FIG. 2 shows the control chain 60 of the engine 18 and of the rotating electrical machine 22 during engaging phases of the coupling means 20. This control chain is implemented only when the switch 54 is placed in the position engaging the coupling means.

In this figure, we see the main heat engine 18, the rotating electrical machine 22 and the coupling means 20, as well as the control lever 52 and the speed sensors 56 and 58 respectively associated with the main heat engine 18 and the rotating electrical machine 22.

The engine 18 and the machine 22 are each connected with a speed regulating unit noted 68, 72, respectively, each receiving as input a rotational speed set point noted N18 and N22. They also receive the indication of the actual rotational speed noted $N_{réel}$ 18 and $N_{réel}$ 22, respectively, for the main heat engine 18 and the rotating electrical machine 22.

Each regulating unit 68, 72 implements a regulating algorithm known in itself to provide a torque control noted C18, C22 respectively applied to the engine 18 and to the rotating machine 22.

The rotational speed set point N18 comes directly from the control lever 52.

The control chain 60 includes a speed synchronizing unit 76 receiving as input the actual rotational speeds $N_{réel}$ 18 and $N_{réel}$ 22 of the main heat engine 18 and the rotating electrical machine 22.

This synchronizing unit 76 includes a subtractor 80 capable of calculating the speed difference between the engine 18 and the rotating electrical machine 22 as well as a filtration module 82. The filtered signal is sent to a summer 86 performing the summation of the filtered speed difference and of the speed set point N18 for the heat engine 18 as produced by the control lever 52. The signal obtained as output from the summer 86 is applied to the input of the regulating unit 72 as speed set point N22 of the rotating machine 22.

Lastly, the synchronization chain 60 includes a hysteresis comparator 90 receiving a null reference threshold value on a first input, and on a second input the result of the difference of the rotational speeds from the subtractor 80. The output of this comparator is connected to the coupling means 20 to engage them when the difference of the rotational speeds is null.

When the ship is full away, the driving of the propeller 14 is done by the main engine 18. To that end, the clutch 20 is coupled, ensuring transmission of the mechanical power from the engine 18 to the propeller. At cruising speed, or during phases requiring a high speed of the ship, the rotating machine 22 is powered from the electrical energy preferably produced by the alternator 31 driven by the turbine 33 and possibly by the alternator 32 driven by the secondary heat engine 30, leading to an increase in the mechanical power provided to the propeller from the transmission line 16.

Advantageously, when the ship is full away, the propulsion power produced by the rotating machine 22 can be adjusted by the control system of the converter 38 in order to use the secondary heat engine at its optimal operating point while limiting, if necessary, the propulsion power of the engine 18, which also makes it possible to reduce polluting emissions.

Advantageously, when the ship is full away, the rotating machine 22 can, according to one operating mode, be used as a generator and produces the electrical energy reinjected into the ship's grid via the energy conversion system 38.

In regulated zones or in maneuvering phases of the ship, and in particular in ports, when the ship moves at a slower speed, the main engine 18 is uncoupled from the transmission line, via the clutch 20, which is released. The main engine 18 is stopped or in maintenance turning sequence. The propeller 14 is then driven only by the rotating machine 22 by the electrical energy provided by the alternator 32 driven only by the secondary heat engine 30, which is by nature less polluting owing to the use of fuel limiting polluting emissions (MDO light fuel or NLG natural gas).

In this operating mode, the energy consumed by the ship is reduced to only the fuel necessary to power the secondary heat engine. The main engine 18 being uncoupled from the transmission line, it does not constitute a load and all of the energy can be applied to the propeller 14. Under these conditions, energy consumption is reduced and atmospheric pollution due to exhaust from the diesel engines is reduced to only the fumes coming from the secondary heat engine 30.

When the ship reaches the high sea, and the main engine 18 must be coupled to the propeller, the system 21 for controlling the coupling is implemented.

Figure 3:
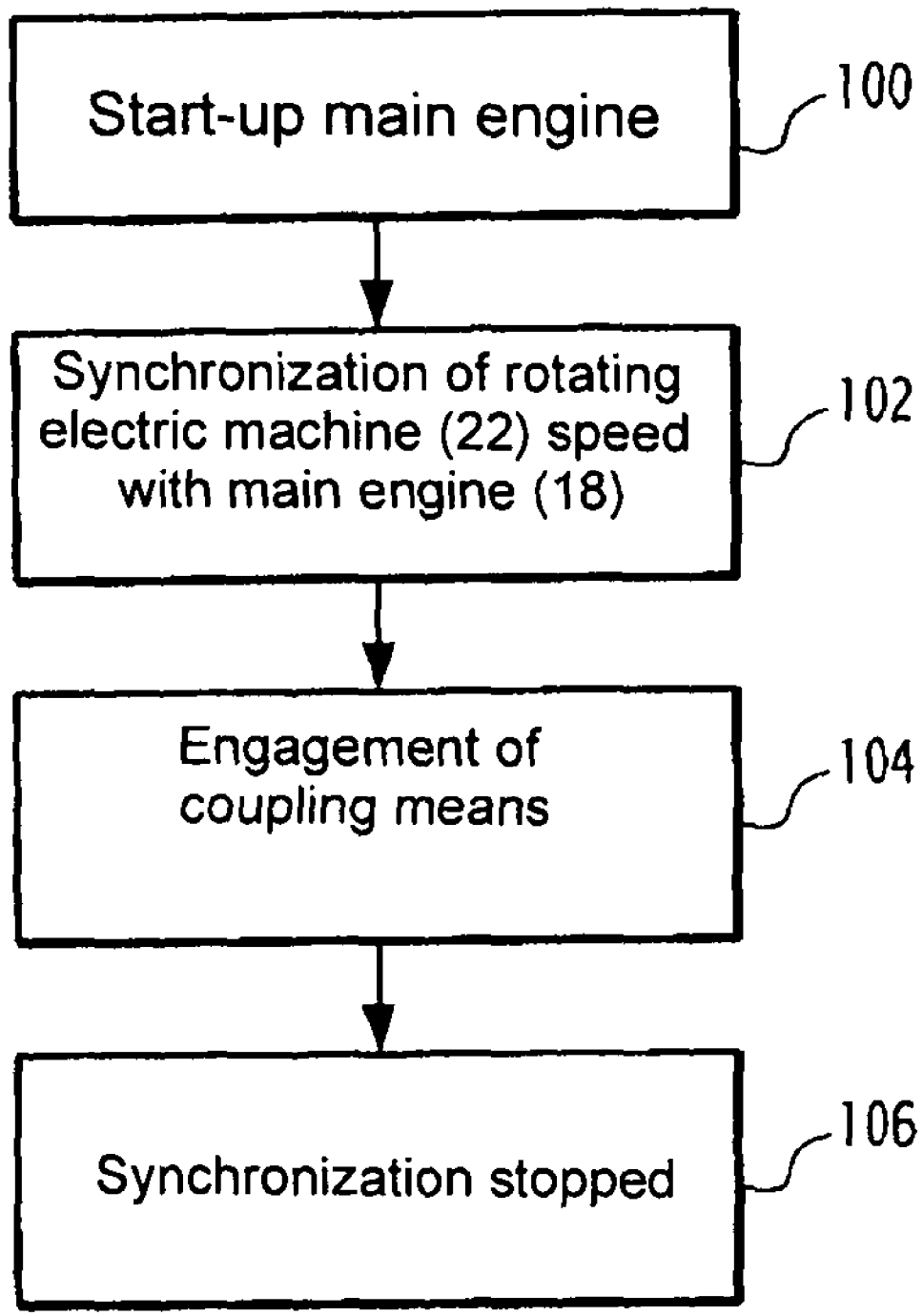
FIG. 3 is an organizational chart of the control of the propulsion chain of FIG. 2 when the coupling means is engaged.

To that end, the algorithm of FIG. 3 is automatically implemented by a central information processing unit 50. This algorithm is triggered by switching the switch 54 into the engaged coupling position, while the ship is initially propelled solely by the rotating machine 22.

In step 100, the main heat engine 18 is started at a predetermined speed corresponding for example to 30% of the normal speed of the moving ship. This speed is adjusted from the control handle 52.

In step 102, the rotational speed of the rotating electrical machine 22 is synchronized with that of the main heat engine 18. To that end, the set point C22 of the rotating machine 22 is adjusted so that the rotational speed N22 of the machine is strictly equal to that N18 of the heat engine 18 from the regulating chain illustrated in FIG. 2. To that end, the converter 38 is consequently piloted by the information processing unit 50.

In the control chain 60, the unit 76 calculates the speed difference between the two machines and that difference, in the summer 86, is added to the speed set point N18 of the engine to produce a corrected speed set point N22 for the rotating machine 22, which is applied by the regulating unit 72.

When the two speeds are equal, as determined by the comparator 80, the coupling means 20 is piloted to be engaged in step 104.

In step 106, the synchronization chain is stopped and, through mechanisms known in themselves, the rotating machine 22 is used as an engine or as an alternator, as previously described.

Alternatively, the coupling means 20 is formed not by a clutch but by a dog, which, to allow the coupling of the engine 18 and the rotating machine 22, requires a predetermined relative position between the lines of those two elements. In this embodiment, the speed sensors 56 and 58 are replaced by position sensors of the lines of the engine 18 and of the rotating machine 22, and an adjustment is done so that the synchronization of the positions is carried out before the engagement of the coupling means.

To disengage the means 20, the control lever 52 remains in position and the order is given by the switch 54. After the order is received by the central information processing unit 50, the main heat engine 18 is gradually relieved by the rotating electrical machine 22. The regulating unit 72 controls the rotating electrical machine 22 via a torque ramp. When the regulating unit 68 of the main heat engine 18 detects a no-load operation of the heat engine 18, for example through a power measurement less than 10% of the nominal power, the disengaging order is given by the central information processing unit 50 to the means 20.

What is claimed is:

1. A propulsion chain for a ship, comprising:
   a main heat engine;
   at least one secondary electrical power house powering a distribution panel;
   at least one transmission line provided with an end propeller and mechanically coupled to the main heat engine to drive the latter;
   at least one rotating electrical machine mechanically coupled to the transmission line and powered from the distribution panel, a mechanical coupler able to be freed from the main heat engine and the rotating electrical machine arranged on the transmission line, between the rotating electrical machine and the main heat engine, a synchronizer for synchronizing the speeds of the rotating electrical machine and the main heat engine before coupling of the rotating electrical machine and the main heat engine, and an engager for engaging the mechanical coupler when the speeds of the rotating electrical machine and the main heat engine correspond.

2. The propulsion chain as recited in claim 1 wherein the main heat engine is a two stroke engine.

3. The propulsion chain as recited in claim 1 further comprising a thrust bearing capable of transmitting a thrust along the axis of the transmission line to a hull of the ship and installed between the propeller and the releasable mechanical coupler.

4. The propulsion chain as recited in claim 3 wherein the thrust bearing is integrated into the rotating electrical machine.

5. The propulsion chain as recited in claim 1 wherein the releasable mechanical coupler of the main heat engine and the rotating electrical machine is a clutch.

6. The propulsion chain as recited in claim 1 further comprising a piloting unit capable of ensuring, during maneuvering phases of the ship, a mechanical disconnection of the main heat engine from the transmission line by releasing the mechanical coupler and a supply of electrical current of the rotating machine owing to the energy supplied by the distribution panel and coming from the secondary electrical power house.

7. The propulsion chain as recited in claim 1 wherein the transmission line is connected, without speed reduction unit, to the main heat engine, such that the propeller is driven in rotation at the rotational speed of the main heat engine.

8. The propulsion chain as recited in claim 1 further comprising a reversible converter for shaping the electric current connected between the rotating electrical machine and the electric distribution panel, the electric distribution panel also being connected to an electrical power distribution system of the ship.

9. The propulsion chain as recited in claim 1 further comprising an energy recovery turbine at an exhaust of the main heat engine, the turbine being mechanically coupled to an alternator having an electrical power outlet, the electrical power outlet being connected to the electrical distribution panel.

10. The propulsion chain as recited in claim 1 wherein the rotating electrical machine includes a rotor mounted around the axis of the transmission line.

11. The propulsion chain as recited in claim 1 wherein the synchronizer includes a torque set point adjuster for adjusting a torque set point of the rotating electrical machine.

12. The propulsion chain as recited in claim 1 wherein the synchronizer includes speed sensors measuring rotational speeds of the main heat engine and the rotating machine.

13. The propulsion chain as recited in claim 1 wherein the synchronizer includes position sensors arranged on the main heat engine and the rotating machine.

14. The propulsion chain as recited in claim 1 wherein the synchronizer synchronizes relative angular positions of the rotating electrical machine and the main heat engine before coupling of the rotating electrical machine and the main heat engine, the engager being adapted to ensure the engagement of the mechanical coupler when the angular positions of the rotating electrical machine and the main heat engine are in predetermined relative positions.

15. A ship comprising: a hull; and a propulsion chain as recited in claim 1.

* * * * *